Figure 1:
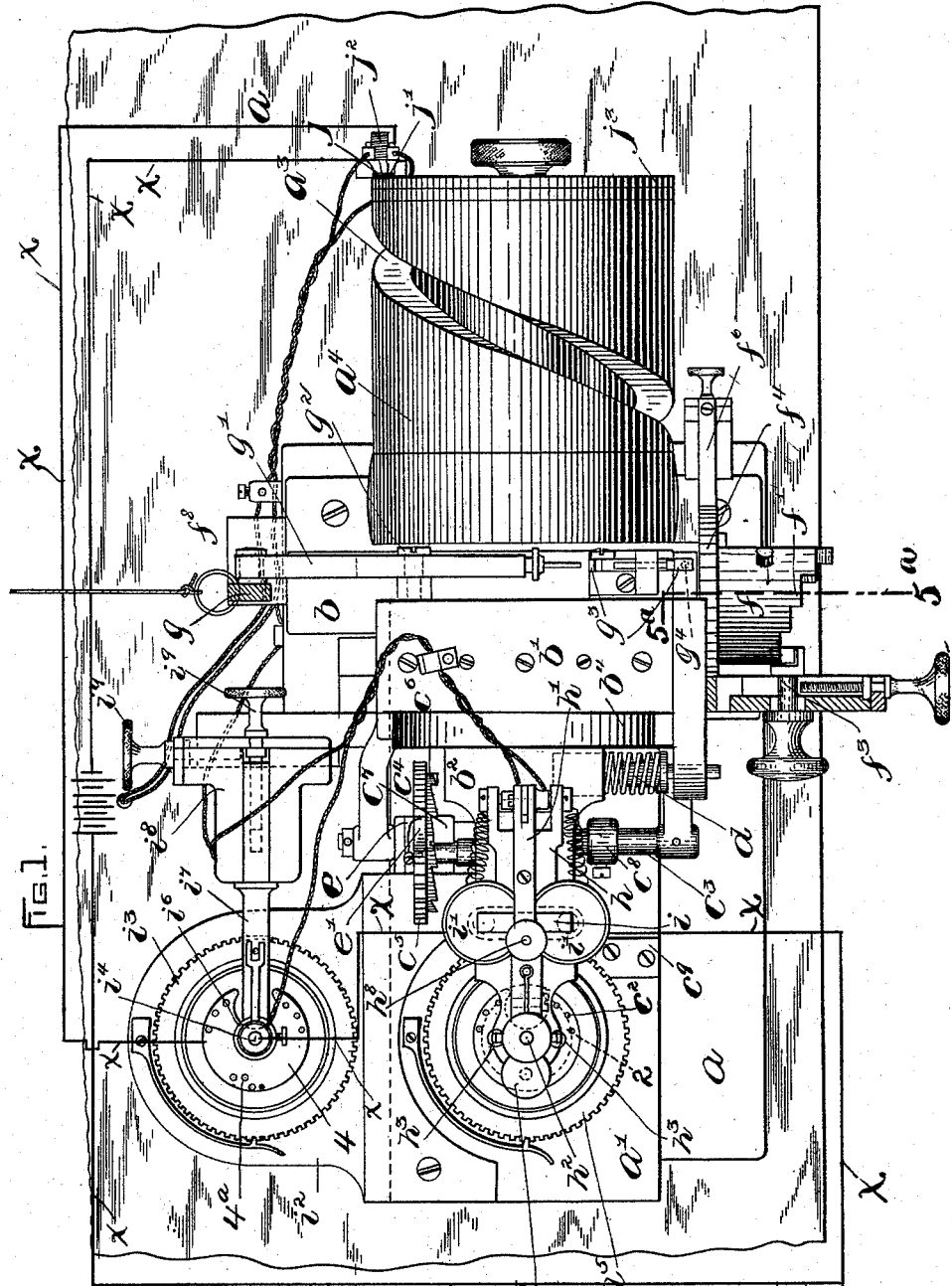

(No Model.)  12 Sheets—Sheet 1.

E. A. MARSH.
ORNAMENTING MACHINE.

No. 527,246. Patented Oct. 9, 1894.

WITNESSES
A. D. Harrison.
F. P. Davis.

INVENTOR.
E. A. Marsh
by Wright Brown Quinby
Attys.

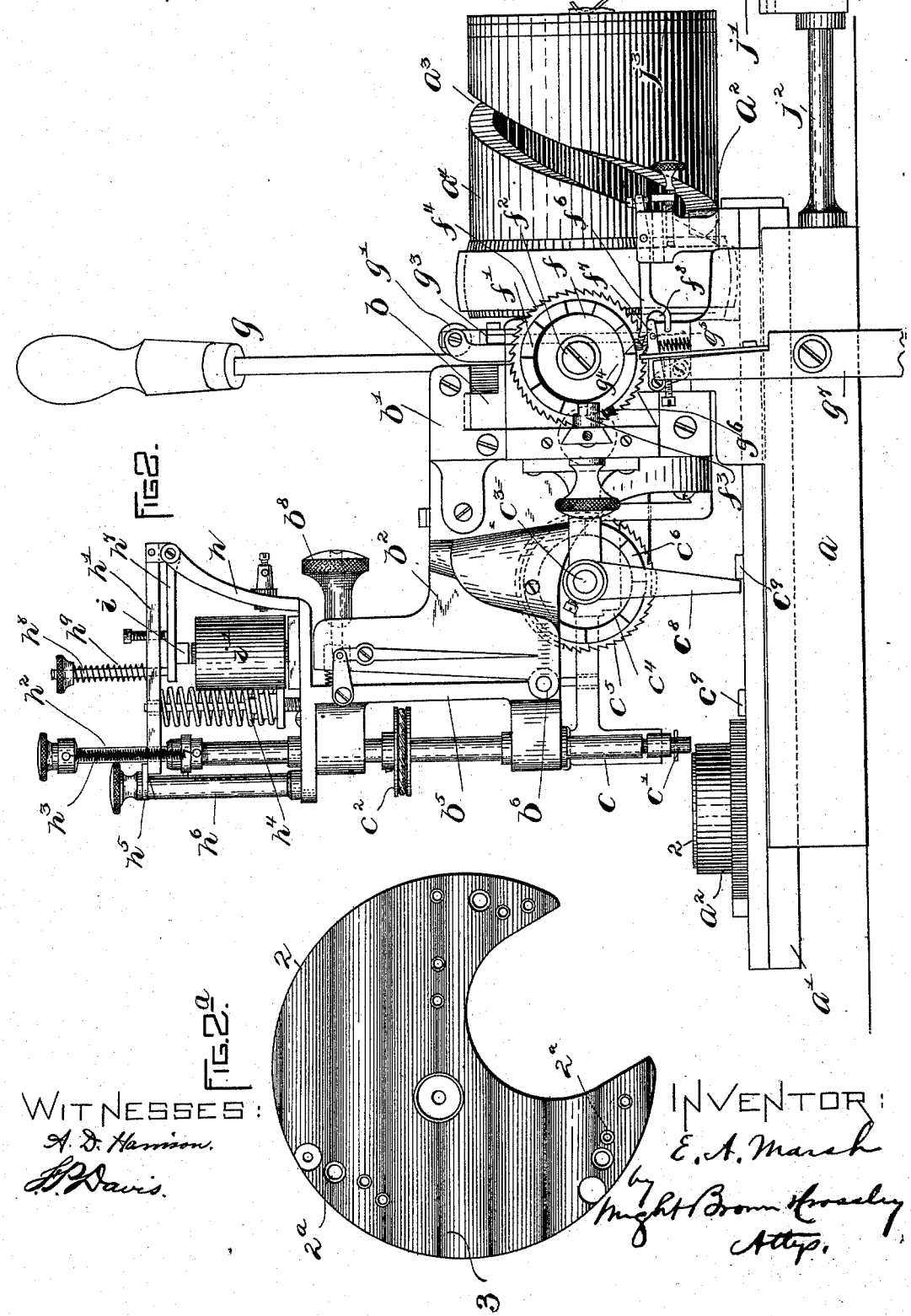

(No Model.) 12 Sheets—Sheet 3.
E. A. MARSH.
ORNAMENTING MACHINE.
No. 527,246. Patented Oct. 9, 1894.
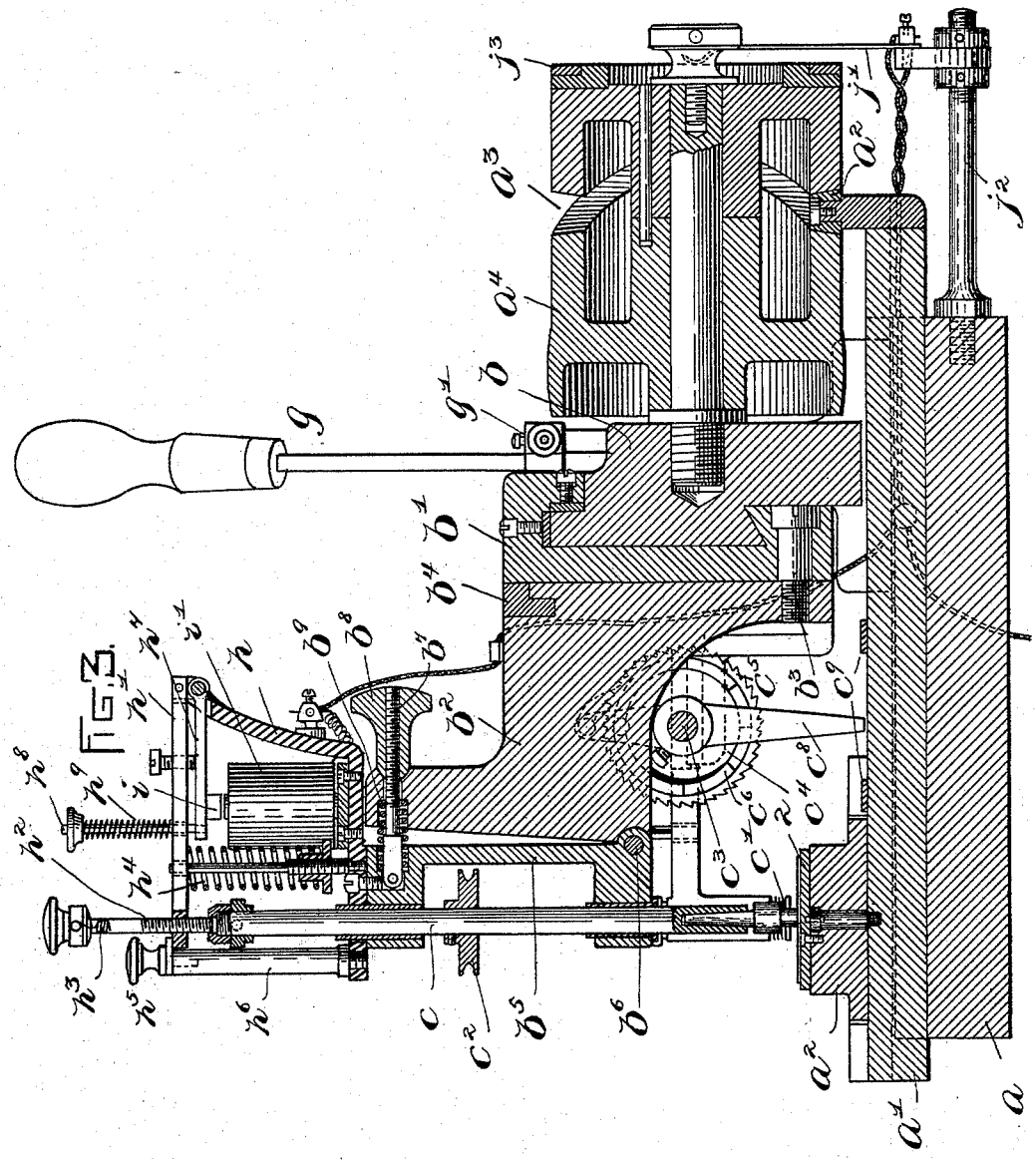
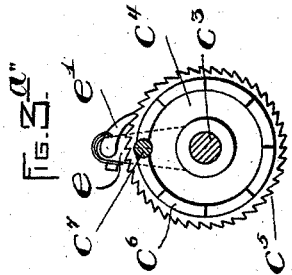
WITNESSES.
A. D. Harrison.
F. P. Davis.
INVENTOR.
E. A. Marsh
by Wright Brown Crossley
Attys.

(No Model.)  12 Sheets—Sheet 4.
E. A. MARSH.
ORNAMENTING MACHINE.
No. 527,246.  Patented Oct. 9, 1894.
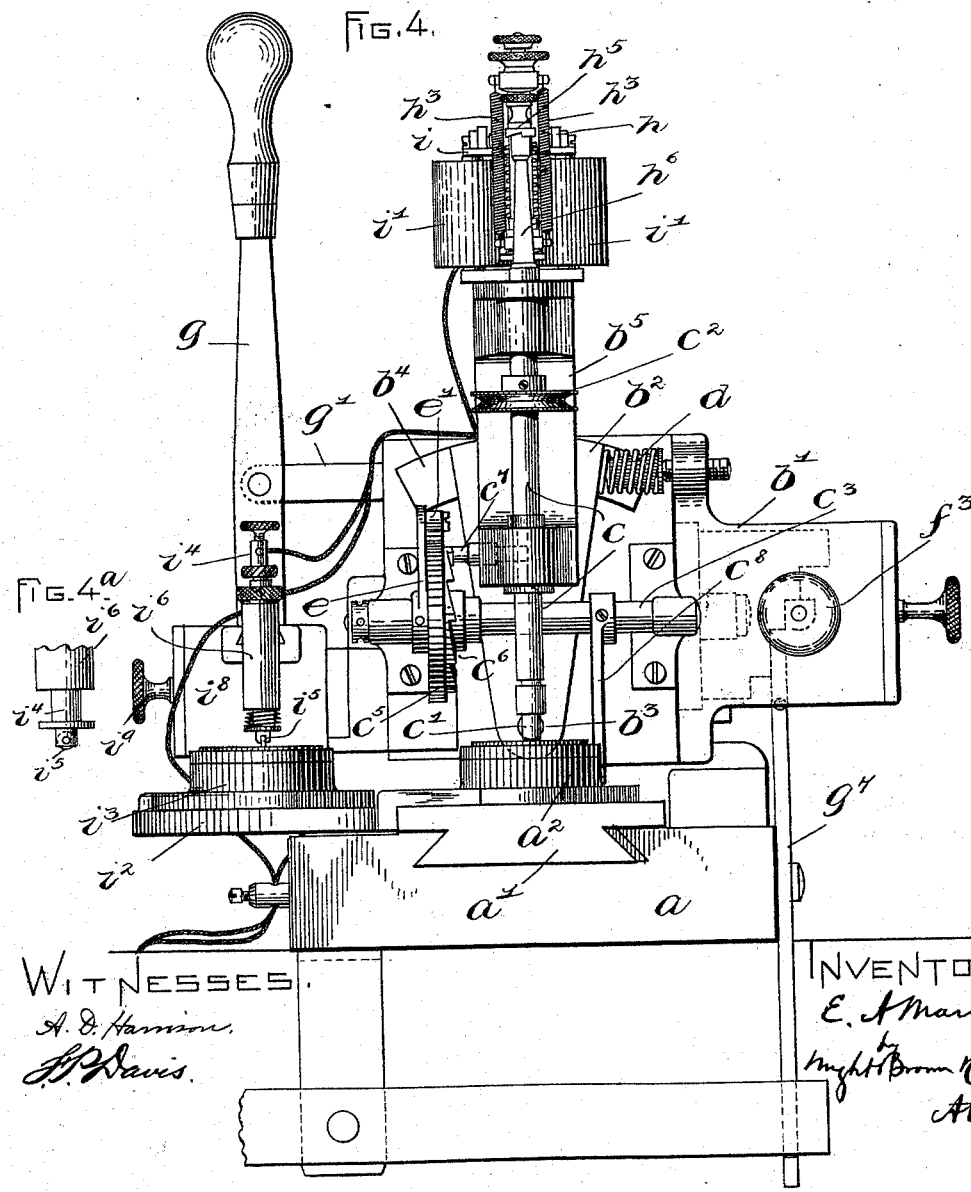

(No Model.) 12 Sheets—Sheet 5.
E. A. MARSH.
ORNAMENTING MACHINE.
No. 527,246. Patented Oct. 9, 1894.
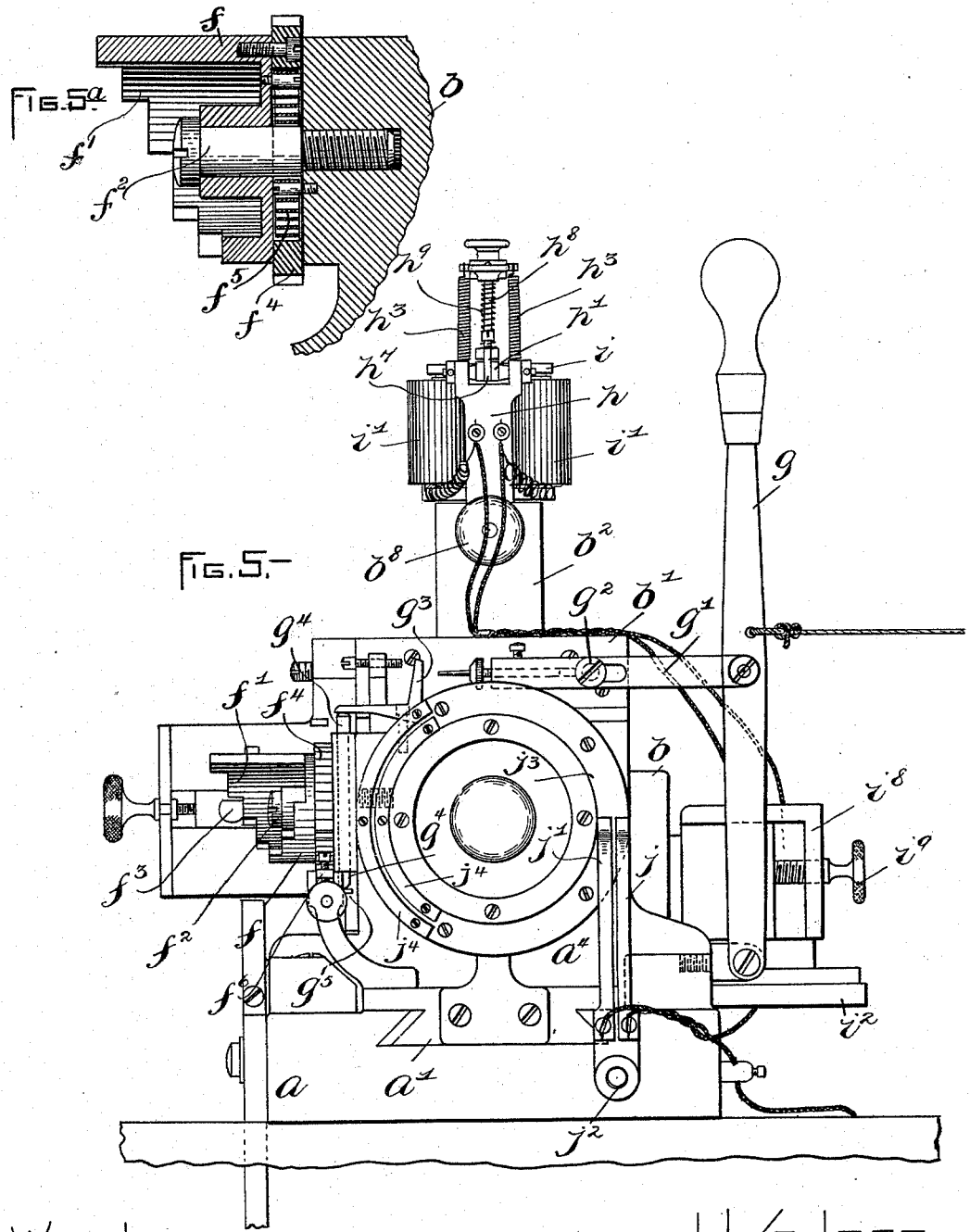
WITNESSES.
A. D. Harrison.
H. P. Davis.
INVENTOR.
E. A. Marsh
by Wright Brown Crossley
Attys.

(No Model.) 12 Sheets—Sheet 6.
E. A. MARSH.
ORNAMENTING MACHINE.
No. 527,246. Patented Oct. 9, 1894.
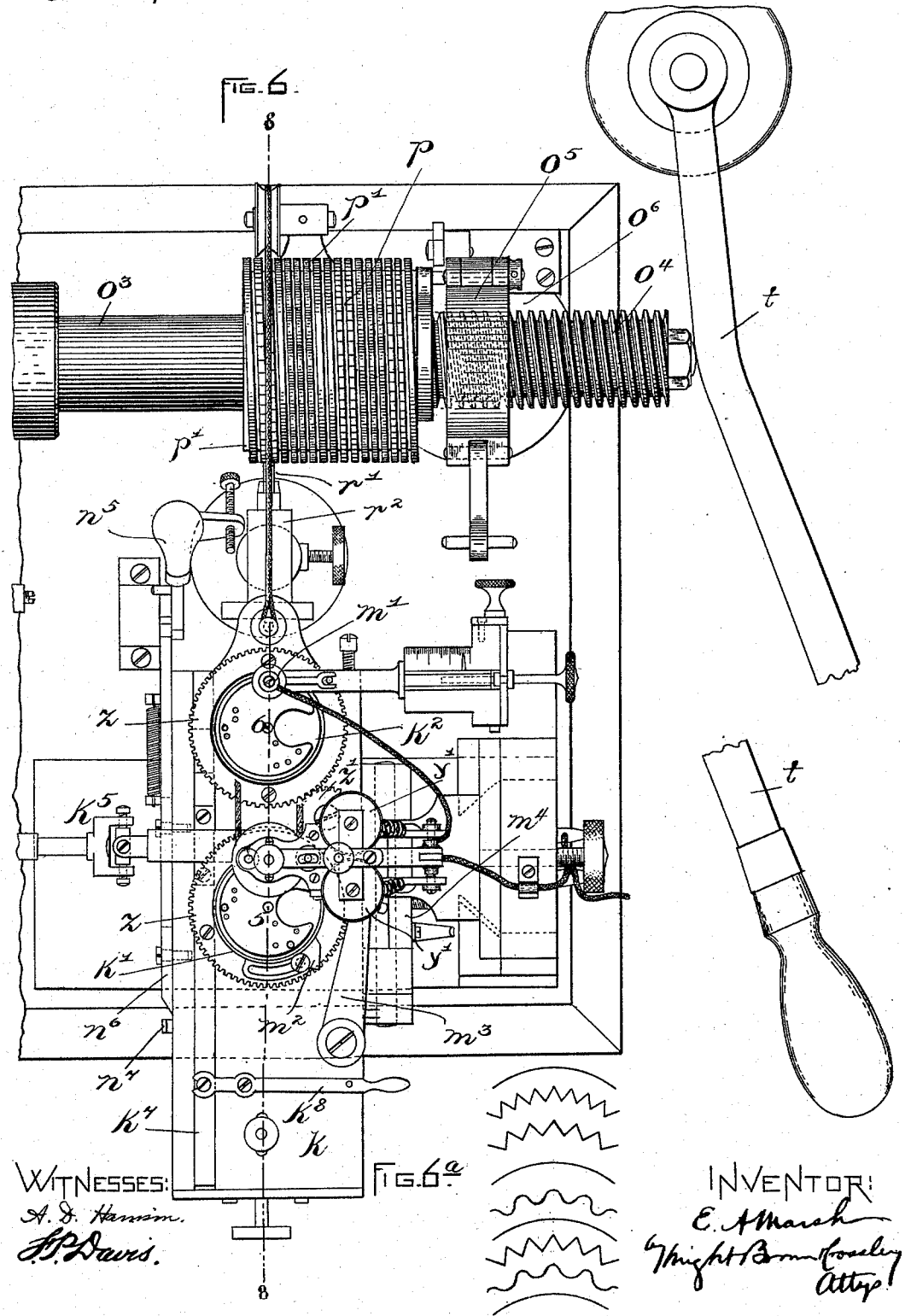
WITNESSES:
A. D. Harrison.
L. P. Davis.
INVENTOR:
E. A. Marsh
by Wright Brown Crossley
Attys (No Model.) 12 Sheets—Sheet 7.

E. A. MARSH.
ORNAMENTING MACHINE.

No. 527,246. Patented Oct. 9, 1894.

WITNESSES:
INVENTOR:

(No Model.) 12 Sheets—Sheet 8.

E. A. MARSH.
ORNAMENTING MACHINE.

No. 527,246. Patented Oct. 9, 1894.

Witnesses
A. D. Harrison
F. P. Davis

Inventor
E. A. Marsh
by Wright Brown Quimby
Attys.

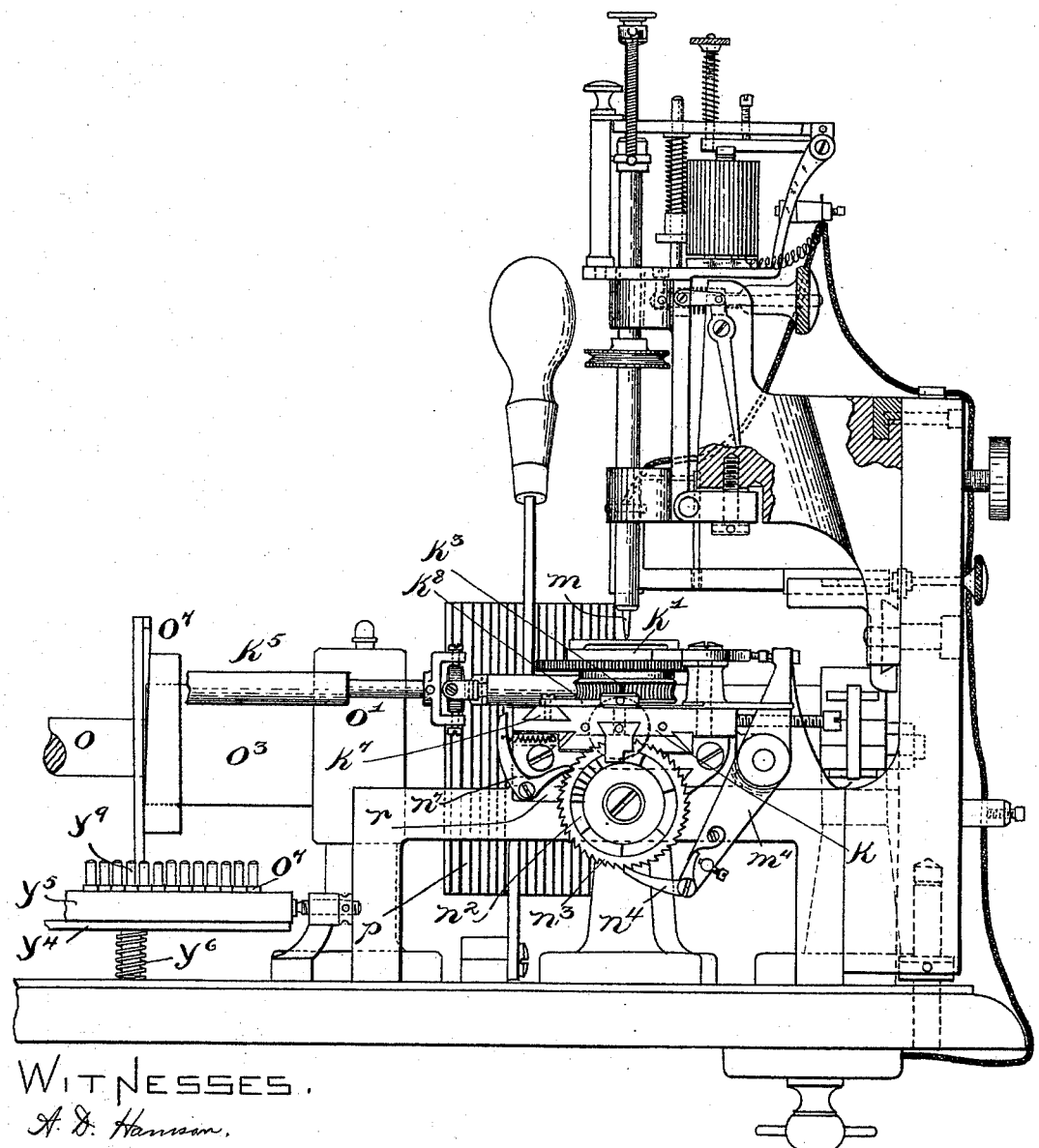

(No Model.)  12 Sheets—Sheet 10.
E. A. MARSH.
ORNAMENTING MACHINE.
No. 527,246. Patented Oct. 9, 1894.
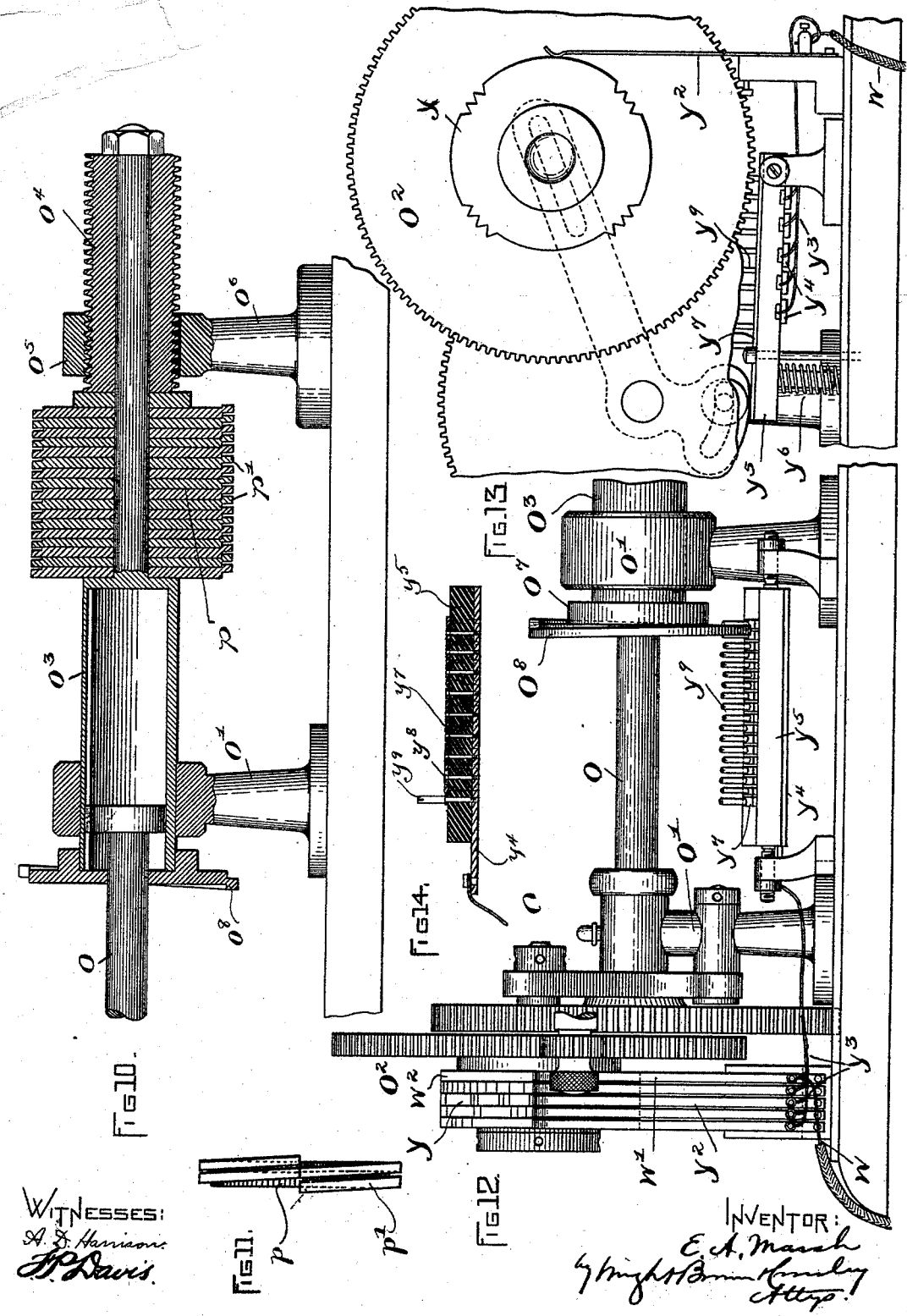
WITNESSES:
INVENTOR:
THE NORRIS PETERS CO., PHOTO-LITHO., WASHINGTON, D. C.

(No Model.)  12 Sheets—Sheet 11.

E. A. MARSH.
ORNAMENTING MACHINE.

No. 527,246.  Patented Oct. 9, 1894.

WITNESSES:
A. D. Harrison
F. Davis

INVENTOR:
E. A. Marsh
by Wright, Brown, Quinby
Attys (No Model.)  12 Sheets—Sheet 12.

E. A. MARSH.
ORNAMENTING MACHINE.

No. 527,246.  Patented Oct. 9, 1894.

WITNESSES:
A. D. Harrison
H. Davis

INVENTOR:
E. A. Marsh
by Wright Brown Crosley
Attys.

UNITED STATES PATENT OFFICE.

EDWARD A. MARSH, OF NEWTON, MASSACHUSETTS.

ORNAMENTING-MACHINE.

SPECIFICATION forming part of Letters Patent No. 527,246, dated October 9, 1894.

Application filed February 27, 1894. Serial No. 501,715. (No model.)

*To all whom it may concern:*

Be it known that I, EDWARD A. MARSH, of Newton, in the county of Middlesex and State of Massachusetts, have invented certain new and useful Improvements in Machines for Ornamenting Watch-Movement Plates, of which the following is a specification.

In the manufacture of watches, it is a desideratum to secure an ornamental finish of the several parts, and this is especially true of the higher grades, in which the appearance of the movement as a whole is a factor of much importance. The foundation-plates, presenting considerable surface, furnish a prominent field for the use of ornamentation. In the cheaper grades, these plates are made from brass, and are given a uniform satin-like appearance and gilded. Some of the better grades of brass movements, and all those whose plates are of nickel alloy, are more or less ornamented by the employment of figures or designs before the coating of gold or nickel is applied. These designs are applied by the use of machines constructed for that special purpose, and equipped with revolving disks or laps, which, being charged with some sharp gritted cutting-powder, such as pulverized oil-stone, corundum, or other suitable substance, and being held in contact with and moved over the surface of the plates in certain prescribed directions, grind or polish the surface slightly, and thereby produce a series of lines or figures of more or less intricate patterns. Movements of the disks or plates to change their relation to each other are regulated by formers or cams, so constructed as to produce the desired pattern or design. Most of the disks or grinders are of necessity quite delicate, in order to produce lines and figures of appropriate character. Heretofore, the disks or laps have been controlled by hand, and as in their operation they require to be held in contact with the surface of the plates, it necessitates a great amount of care and the strictest and most unremitting watchfulness, as well as instant and skillful movement of the hand of the operator, to insure the completeness of the figures, and to prevent disaster to the disk, which is liable to injury by running into any of the numerous holes in the plate, or by being caught and broken by contact with any of the projecting surfaces of the plate. It is obvious, therefore, that no operator could attend to more than one machine, and also that, even with the closest care and attention, there is great probability of injury to the delicate disks, or of the production of imperfect figures, which would necessitate a repetition of the operation and consequent loss of time. Moreover the constant watching of the moving and constantly-varying surface of the plates is wearisome to the eyes and demands the best of light.

To insure accuracy and uniformity in the production of the ornamental figures, to guard against injury to the cutting disk, and also to greatly increase the amount of work performed by a single operator are the objects of my invention, which contemplates automatic means for controlling the disks or laps and other elements of the machine heretofore controlled by hand.

The manner of ornamenting the plates varies extensively. It is customary to produce ground work of broad flutes, which may extend straight across the plates in parallel lines, or circularly around the plates in concentric lines, or radially of the plate. Over this ground work ornamentation in fine lines, dots and dashes of varying character are made to produce different designs.

The invention is capable of embodiment in a machine for doing any of the above work, the different character of the work involving various different provisions in the machine, all, however, lying within the scope of the invention.

In the accompanying drawings two forms of machines are illustrated, one designed to produce the parallel flutes extending straight across the plate, and the other designed to produce the circular concentric flutes and also the fine design lines.

Figure 1 shows a plan view of the first-named form of machine. Fig. 2 shows a side elevation of this machine. Fig. 2ª is a representation of the work done by the machine. Fig. 3 shows a longitudinal section of the same. Fig. 3ª shows a detail of parts indicated in broken lines in Fig. 3. Fig. 4 shows a front end elevation. Fig. 4ª shows a detail of a tracer-finger appearing in Fig. 4. Fig.

Figure 7:
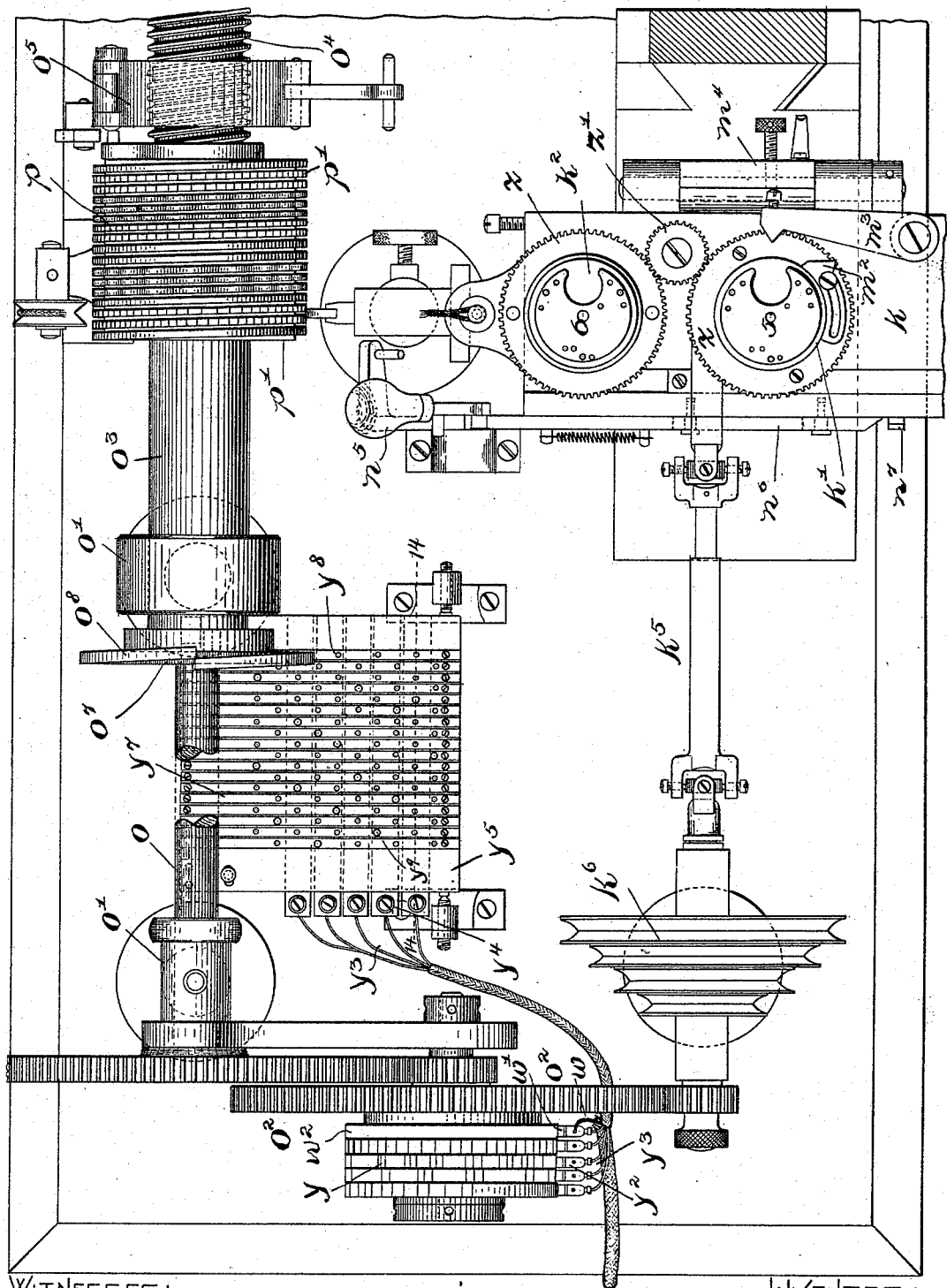
Figure 9:
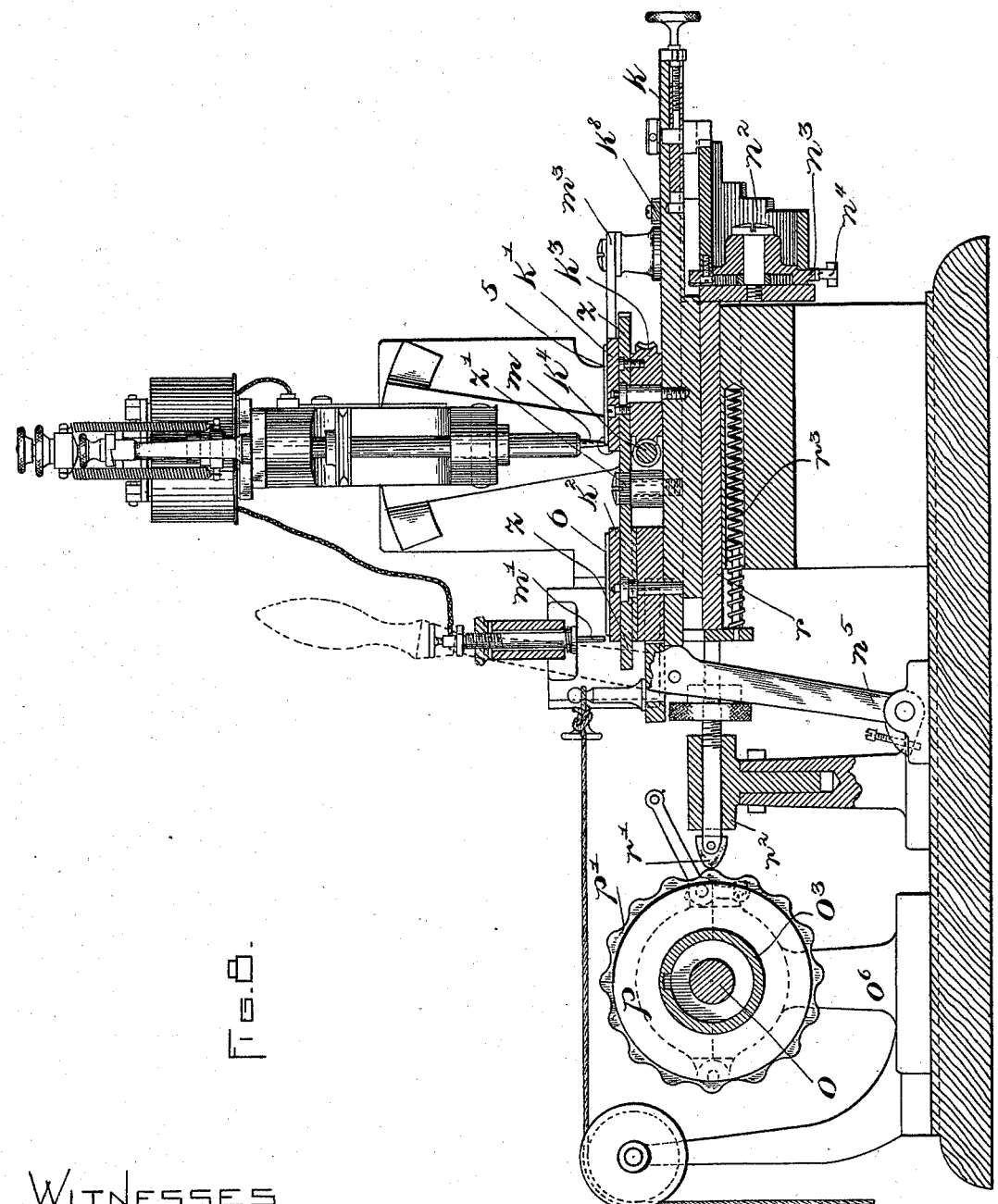
Figure 15:
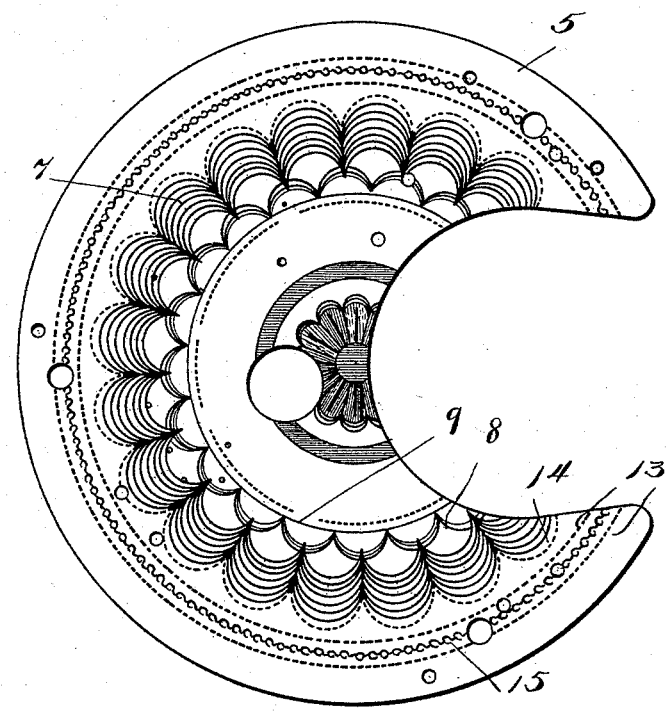
Figure 16:
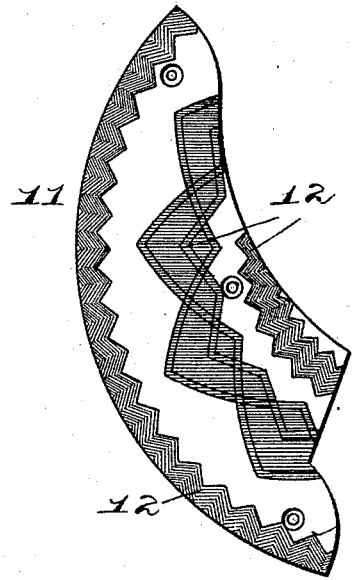
Figure 17:
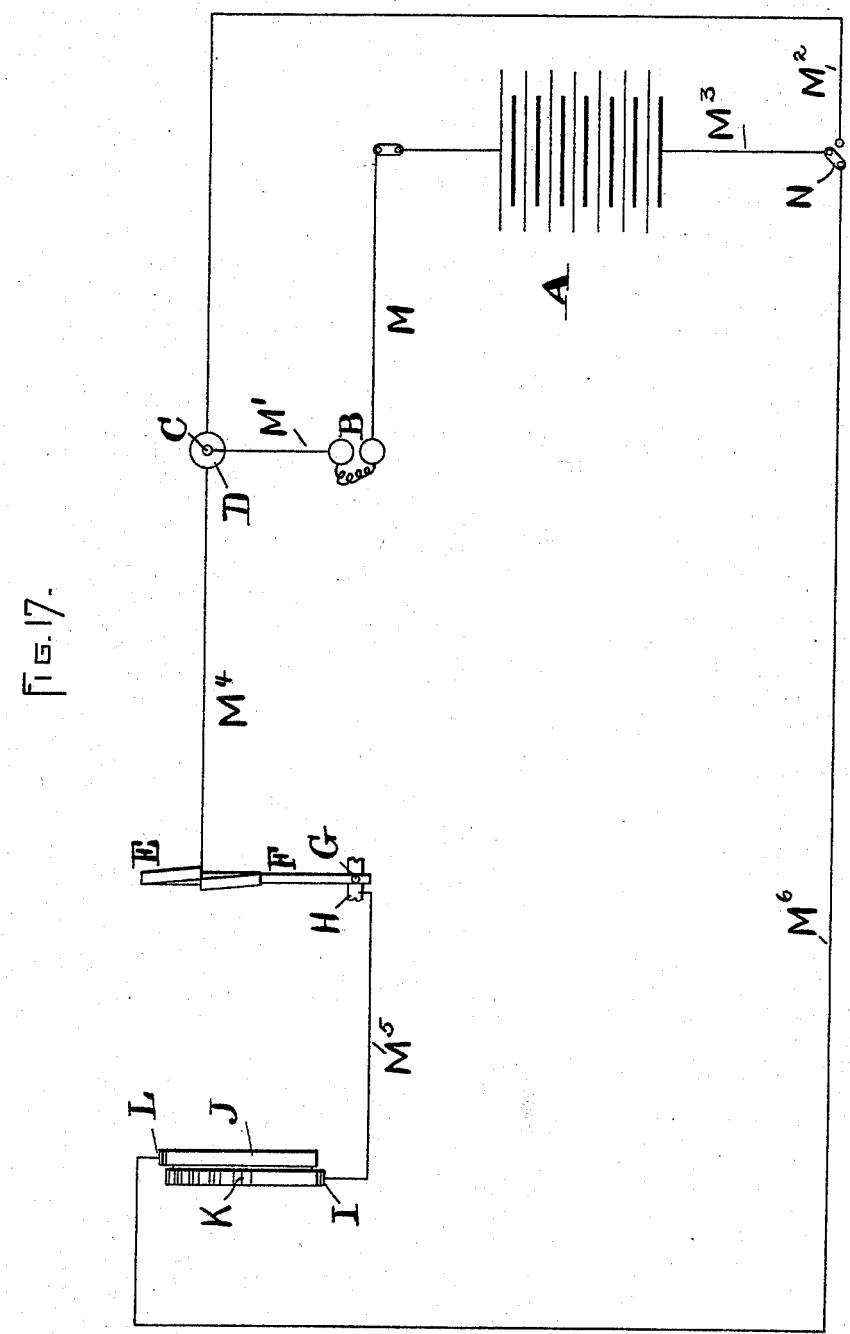

5 shows a rear end elevation. Fig. 5<sup>a</sup> shows a section on line 5<sup>a</sup>—5<sup>a</sup> of Fig. 1. Fig. 6 shows a top plan view of part of the second-named form of machine. Fig. 6<sup>a</sup> shows diagrams illustrative of the character of design this machine as shown is calculated to produce. Fig. 7 shows a plan view of that part of the machine not shown in Fig. 6, and also of some of the same parts as appear in said Fig. 6. Fig. 8 shows a section on line 8—8 of Fig. 6. Fig. 9 shows a front elevation of part of the machine. Fig. 10 shows a longitudinal section of pattern-devices and appurtenances. Fig. 11 shows a detail edge view of two of the pattern-disks, illustrating the manner in which they are fitted together. Fig. 12 shows a front elevation of those parts of the machine not appearing in Fig. 9. Fig. 13 shows certain parts as they appear in end elevation from the left of Fig. 12. Fig. 14 shows a section detail on line 14—14 of Fig. 7. Figs. 15 and 16 illustrate samples of work which the machine is capable of producing. Fig. 17 is a diagram of an electric circuit.

The same letters and numerals of reference indicate the same parts in all the figures.

Referring first to Figs. 1 to 5, the letter $a$ designates the stationary supporting-bed of the machine, which has a slide-way receiving a longitudinally-reciprocating carriage $a'$, whose reciprocations are effected by the engagement of a roll $a^2$ on the carriage with a cam-groove or slot $a^3$ in a driving-pulley $a^4$, supported on a stud fastened in a standard $b$ on the bed $a$, the form of the said slot being such as to produce a quicker return than advance of the carriage. The carriage supports a rotatively-adjustable holder $a^5$, having suitable provisions for positively holding the plate or plates 2 to be treated, and the reciprocations of the carriage cause the straight parallel flutes 3 to be made. The carriage is reciprocated a number of times in the formation of each flute, and it is desirable that the grinding disk or lap be tilted on one angle when starting the flute, and on an opposite angle when finishing the same, so as to clearly define the sides of the flute, and it is also desirable to tilt the lap rearwardly in its advance to secure an effective finish. When one flute is made, the grinding-lap is moved laterally to position it for forming the next one.

The means here shown for accomplishing the above are as follows: A sliding carriage $b'$ is supported on a slide-way formed on the standard $b$, and is actuated in a rearward direction by a spring, weight or other agent. It may be well to here state that the formation of the flutes begins at the side of the plate which is toward the front side of the machine and progresses rearwardly. An oscillatory support $b^2$ is mounted on a pivot-stud $b^3$ in the carriage $b'$, and engages an arc-shaped guide-way $b^4$ on the said carriage, and a holder $b^5$ is pivoted at its lower end to the support $b^2$, as shown at $b^6$, and is connected at its upper end with said support by an adjusting-bolt $b^7$ and nut $b^8$, an expanding spring $b^9$ being mounted on the bolt between the holder and support. By turning the nut $b^8$ the angular adjustment of the holder $b^5$ is determined. A spindle $c$ extends loosely through vertical bearings on the holder $b^5$, and the grinding disk or lap $c'$ is secured on the lower end of this spindle, the latter carrying a pulley $c^2$, for receiving rotary motion. The adjustment of the pivotal holder $b^5$ determines the rearward angle of the grinding lap. A spring $d$ impels the oscillatory support $b^2$ toward one end of the arc-shaped guide-way $b^4$, and causes the lap to assume the proper angle for starting the flute. With each advance of the carriage $a'$, this oscillatory holder is moved on its pivot, so that the angular adjustment of the grinding lap is changed step by step, and during the last advance of the carriage it stands on an angle reverse to that on which it stood in starting the formation of the flute.

The intermittent change in the angular adjustment of the grinding lap is brought about through the following means: A shaft $c^3$ is journaled in bearings on the carriage $b'$, and a ratchet $c^4$ is mounted loosely on said shaft and has peripheral teeth $c^5$ and side teeth $c^6$, and the form and arrangement of the teeth are such that the circumferential extent of each one of the side teeth is correspondingly equivalent to the circumferential extent of a number of the peripheral teeth equal to the number of reciprocations of the carriage $a'$ in the formation of a single flute, the number in the present instance being five. A stud $c^7$ is fastened in the oscillatory support $b^2$, in position for engagement with the side section of the ratchet, and held in engagement therewith by the spring $d$. An arm $c^8$, affixed to the shaft $c$, extends between two projections $c^9$ on the carriage $a'$ of sufficient lateral extent to allow for the movements of the carriage $b'$. Another arm $e$, also affixed to the shaft $g$ carries a pawl $e'$, engaging the peripheral section of the ratchet. With each advance of the carriage $a$, one projection $c^9$ acts against the arm $c^8$, and causes the pawl $e'$ to move the ratchet through the extent of one of its peripheral teeth. The return of the carriage causes the other projection $c^9$ to act on the arm $c^8$ and carry the pawl over the next tooth. Each time the ratchet is thus actuated, the oscillatory support $b^2$ is moved one step by reason of the incline of the side tooth acting against the stud $c^7$. Upon the fifth advance of the carriage, the side tooth is carried past the stud, and the spring $d$ returns the oscillatory support to its normal position and the grinding lap to angular adjustment for a new flute.

The movement of the carriage $b'$ which takes the grinding lap to position for forming a new flute is controlled through the following instrumentalities: A step-gage in the form of a cylindrical shell $f$, having steps $f'$ at its outer end and graduated in the direction of its length, is rotatively supported on a stud $f^2$ fastened in the standard $b$, and an adjustable abutment $f^3$ on the carriage $b'$ is carried against the step-gage by the spring, weight or other agent hereinbefore mentioned as impelling the said carriage. A ratchet-wheel $f^4$ is fixedly connected with the shell $f$, and is actuated in a direction to impel the highest portion of the step-gage toward the abutment $f^3$ by a helical spring $f^5$, inclosed within the ratchet and attached at one end thereto and at the opposite end to the standard $b$. A pawl $f^6$, adjustable both as to longitudinal position and pivotal movement is supported on a standard erected on the carriage $a'$, and is adapted to encounter the ratchet $f^4$ under advance of said carriage and move the ratchet the extent of one tooth. A spring-actuated detent $f^7$ prevents back-movement of the ratchet and extends into a bifurcation $f^8$ formed at the end of the pawl $f^6$. At the beginning of operation upon a plate, the carriage $b'$ is at the end of its movement toward the front side of the machine, and the abutment $f^3$ is against the highest step $f'$. The intermittent movement transmitted to the ratchet $f^4$ by the carriage $a'$ moves this highest step from behind the abutment $f^3$ upon the completion of the flute, whereupon the carriage $b'$ moves back one step, the abutment coming against the next lowest step. This operation continues throughout the treatment of the plate, and it will be observed that the spring $f^5$ is wound up by the movement of the ratchet. Upon the completion of the plate, the carriage $b'$ is restored to its first position, and the ratchet $f^4$ is released by operating a hand-lever $g$. The latter is pivoted to the bed of the machine, and is connected with the carriage $b'$ by a bar $g'$ and screw $g^2$ passed through a slot in said bar and entering the carriage, whereby a limited independent movement of the bar is permitted, the object of which is to effect the release of the ratchet through the following connections: A bell-crank lever $g^3$, pivoted to the standard $b$, stands in the path of the bar, and bears on a tappet-rod $g^4$ extending down through the standard $b$ and resting on a pin $g^5$ fastened to the detent $f^7$. The machine is automatically stopped upon completing a plate, by a projection $g^6$ on the shell $f'$, acting against a shipper-lever $g^7$, suitably connected with belt-shifting devices (not shown).

The arrangement whereby the operative position of the grinding lap is automatically controlled, with due regard for the occurrence of holes and projections in the plate, will next be described.

Normally the lap is supported yieldingly out of contact with the work. A bracket $h$ is secured on the upper end of the holder $b^5$, and supports a hinged arm $h'$, carrying a screw $h^2$, which bears on the upper end of the spindle $c$ and is connected therewith by springs $h^3$. Said arm is upheld by a spring $h^4$, and its upward movement is limited by an adjustable stop $h^5$, on the upper end of a post $h^6$ erected on the bracket $h$, said stop being of partly circular form and tapering on the under side, so that by turning it the upward movement of the arm $h'$ may be regulated. The wearing away of the grinding lap is compensated for by turning the screw $h^2$. A lever $h^7$, pivoted to the bracket $h$ below the arm $h'$, carries a screw $h^8$, which projects through said arm; and a spring $h^9$, surrounding said screw and bearing at one end against the arm and at the other against a nut on the screw, forms a yielding connection between the arm and lever, a screw-set being entered through the arm to limit the action of said spring. The lever $h^7$ carries an armature $i$, and the bracket $h$ supports electro-magnets $i'$ below the armature.

The carriage $a'$ has a lateral extension $i^2$, which supports a rotatively-adjustable holder $i^3$, having provisions for holding a fac-simile of the plate or plates under treatment, in the shape of a pattern-plate or plates 4. A tracing finger $i^4$ is adapted for contact with the pattern-plate, and may be provided with an anti-friction roller $i^5$. Said finger is adjustably supported in a sleeve $i^6$ on the end of an arm $i^7$, the latter engaging a slide-way in a slide $i^8$, which engages a slide-way on the carriage $b'$. By means of screws $i^9$, the arm $i^7$ may be adjusted longitudinally and laterally, and positoned to correspoind in its relation to the pattern-plate exactly with the position of the grinding lap in relation to the work. The tracing finger is thoroughly insulated from the rest of the machine, and it and the pattern-plate are included in an electric circuit which embraces the electro-magnets $i'$, so that when the finger is in contact with the pattern-plate the electro-magnet is energized and draws the armature and lever $h^7$ down and consequently the arm $h'$, and thereby brings the grinding lap to bear on the work. Whenever the tracing finger arrives at a depression in the pattern-plate, as one of the holes $4^a$, occurring at numerous points in the plate, the circuit is immediately broken and the grinding lap raised out of operative position, so that it skips the corresponding hole $2^a$ in the work. By this means, the lap is caused to act on all the surface of the plate it is desired to treat, and is caused to jump all the openings, so that there can be no possibility of the lap encountering the edges of an opening and having its grinding surface impaired thereby. The grinding lap is in this manner absolutely controlled, and can be caused to operate on the work at exactly the points desired and through exactly the extent desired.

The lap is prevented from bearing on the plate under treatment during the return movement of the carriage $a'$ through the following agencies: The electric circuit heretofore mentioned is made to include a pair of brushes $j\ j'$, supported on an arm $j^2$ projecting from the bed $a$, and insulated there-from and from each other, and said brushes bear against an insulated annular plate $j^3$ fastened on the end of the pulley $a^4$. Throughout that portion of the annular plate corresponding in circumferential extent with that portion of the cam-groove $b^3$ which advances the carriage, the said annular plate is in one piece, and electrically connects the brushes, so that the circuit is not disturbed; but throughout that portion of the plate which corresponds in circumferential extent with that portion of the cam-groove which retracts the carriage, the annular plate is composed of two strips $j^4$, insulated from the remaining portion of the plate and from each other, so that during the engagement of the roll $a^2$ with this latter portion of the cam-groove the circuit is broken and the lap held out of contact with the plate.

The general operation of the machine above described may be stated briefly as follows: The plate or plates 2 to be treated having been placed in the holder $a^2$, and the fac-simile plates 4 having been placed in the holder $i^3$, the machine is started with the carriage $b'$ at the forward end of its travel, and the carriage $a'$ reciprocates five times in forming a flute at the front side of the plate, the grinding lap being tilted step by step from one inclination to a reverse inclination in the manner hereinbefore described. At the fifth reciprocation, the grinding lap returns to its initial angularity, and the step-gage releases the transverse carriage from the highest step and allows it to shift the grinding lap to a new position, and the operation above described is repeated in the formation of the next flute. This continues until the grinding lap has covered all the plate-surface, and then the machine is automatically thrown out of action, and the carriage $b'$ is restored to its initial forward position, the action of restoring this carriage also releasing the step-gage in the manner previously described, and the latter being returned to normal adjustment by its helical spring.

Throughout the operation, the tracing finger traverses the fac-simile plate in parts exactly corresponding with those parts of the work which the grinding lap traverses; and wherever a hole or depression occurs, the electric circuit is broken by the tracing finger leaving contact with the fac-simile plate, and the grinding lap is raised from the work momentarily. A diagram of the circuit may be seen in Fig. 1, where the lines $x$ indicate its course.

The machine illustrated in Figs. 6 to 14 is substantially like that shown in Figs. 1 to 5 in a number of features; but, as the machine is designed to execute circularly-extending delineations on the plate, the work is given a rotary movement and other parts are made to conform therewith, all as hereinafter described.

A transversely-movable carriage $k$ supports rotary holders $k'$ $k^2$, which are operatively connected together by gearing $z$ $z'$, as shown, so as to rotate in exactly the same time, one of said holders, $k'$, being for the plate or plates 5 to be ornamented, and the other, $k^2$, for the fac-simile plate or plates 6. These holders are rotated by means of a worm-wheel $k^3$ on the holder $k'$, a worm $k^4$ engaging said wheel, and a telescopic and universally-jointed shaft $k^5$ operatively connected with said worm and carrying a cone-pulley $k^6$ for receiving rotary motion. The bearing in which the worm rests is on a slide $k^7$ in the carriage $k$, so that, by moving said slide, the worm may be thrown out of engagement with the worm-wheel, so as to permit adjustment of the holders. Movement of the slide to accomplish this is effected by means of a lever $k^8$, pivoted to the carriage, and engaging the slide on one side of the pivot, while on the opposite side of the pivot it is adapted to engage pins on the carriage which determine its two positions. Movement of the carriage $k$ changes the relation of the grinding lap to the center of the plate for the formation of different delineations, and hence the said lap is not moved transversely as before and the tracing finger $m'$ remains fixed. Otherwise the constructions and arrangements of parts for supporting and adjusting the lap and the tracing finger are the same as described in the other machine. Below the carriage $k$ are a step-gage $n^2$ and a ratchet $n^3$ of substantially the same construction as previously described, the carriage $k$ having an abutment, which is held against the step-gage by a weight or spring connected with the carriage. The ratchet $n^3$ is actuated by a pawl $n^4$ on a lever $m^4$, which is periodically actuated by a striker $m^2$ on the rotary work-holder, acting through the medium of a lever $m^3$. A hand-lever $n^5$, which returns the carriage $k$ to its normal position, also, through the medium of a bar $n^6$ extending in guides on said carriage, trips a retaining detent $n^7$ out of engagement with the ratchet $n^4$, so as to allow the helical spring in the same to restore it to its initial position.

The parts thus far mentioned operate in the execution of broad circular concentric ground-work flutes, and the general operation is as follows:—The machine is started with the carriage $k$ at the forward limit of its travel, and the work thus positioned for the formation of the outermost flute, the fac-simile being likewise positioned with respect to the tracer. The rotation of the work subjects it to the action of the grinding lap and causes the formation of a circular flute, the lap being tilted step by step, as previously explained in the description of the other style of machine, for the purpose of clearly defining the sides of the flute. A certain number of rotations of the work-holder moves the highest step of the step-gage from behind the abutment on the carriage, and the latter moves back until the abutment comes against the next lowest step of said gage, which movement of the carriage shifts a new part of the plate-surface nearer the center of the work to position for action of the grinding lap. The operation above described is repeated to form an inner flute. Upon the completion of the work, the carriage is restored by operating the hand-lever, and the step-gage is released and restored to its initial position by the helical spring within it.

Besides making circular ground-work flutes, this latter machine is also adapted for executing designs composed of circularly-extending fine delineations of varying character, a fine-pointed grinding implement $m$ being substituted for the disk or lap.

To adapt the machine for making irregular lines, as scallops, after certain prescribed patterns, in addition to plain circular lines which can be made by the machine as thus far described, the following means are employed: A shaft $o$ is supported in fixed bearings $o'$, and is connected with the shaft $k^5$ through gearing $o^2$, which causes the said shaft $o$ to rotate in exactly the same time as the plate-holder $k'$. A sleeve $o^3$ is mounted on the shaft $o$, so as to rotate therewith but be capable of longitudinal movement thereon, said sleeve being splined to an enlargement of the shaft, so as to remove the point of connection as far as possible from the center of rotation. Said sleeve carries affixed to it a screw $o^4$, and a half-nut $o^5$ is hinged to one side of a bearing $o^6$ supporting the screw, and is arranged to be thrown into and out of engagement with the screw, suitable clamping means being provided to lock it in engagement with the screw. The sleeve is designed to carry affixed to it a pattern-cam, which is composed of a plurality of disks $p$, whose peripheries are formed with spirally-extending strips $p'$, so constructed that, when the disks are fitted together closely side by side, the ends of the said strips abut and the latter form a continuous spiral. The strips $p'$ are made with a contour to correspond with the design which is to be executed on the plate under treatment, and each disk controls a single delineation extending completely around the plate. Hence the contours of the strips on the disks vary, some of said strips being plain, while others are scalloped. By making this pattern-cam up of a number of disks, not only is the manufacture facilitated, but great variation in design on the plate may be brought about by different ways of assembling the same disks.

An auxiliary slide $r$, in the machine-bed below the carriage $k$ and supporting the step-gage, carries a toe-piece $r'$, slidingly supported in a horizontal bearing $r^2$ and constantly actuated toward the pattern-cam by a spring $r^3$. This spring, by constantly pressing the toe-piece into contact with the pattern-cam, causes the carriage $k$ to follow the contour of the cam and produce delineations on the plate to correspond therewith. Thus, if the cam-strip on a disk is scalloped, a vibratory motion of the carriage is produced by the alternating action of the cam and the spring, said vibratory motion being productive of a scalloped line extending circularly around the plate. The pitch of the screw $o^4$ is made to correspond with that of the spiral cam-strips, so that the cam-strips consecutively engage the toe-piece, and the step-gage is constructed with regard to the design to be executed.

As an example of a design which can be produced by the mechanism above described, attention is called to Fig. 15. A number of scalloped cam-disks act consecutively on the toe-piece, producing a uniform vibration of the carriage, and the step-gage moves intermittently, so as to bring the center of the plate a step nearer the grinding implement with the completion of each scalloped line, so that a number of lines 7 of the same character are made over the surface of the plate, 5. When this is done, a longer surface between steps occurs in the gage, and the relation of the work and the grinding-tool remains unchanged during another circuit, while in the meantime the form of the acting cam-strip is such that its scallops alternate with those of the preceding cam-strip, and the scalloped line 8 made on the plate crosses that previously made. Then a plain cam-strip may occur, and during its co-action with the toe-piece the carriage is not moved, so that a plain circular line 9 is made on the plate.

It will be readily seen that the possibilities in variations of design producible by such a mechanism are limitless.

When a design is completed, the half-nut $o^5$ is unlocked and raised out of engagement with the screw, and by means of a lever $t$ the sleeve is slid back on the shaft and the cam thereby restored to the starting-point, the toe-piece being withdrawn from operative position during this operation.

The arrangement of pattern-disks shown in Fig. 6 would be productive of a series of concentric lines such as illustrated in Fig. 6$^a$.

Fig. 16 illustrates another style of design which the machine is capable of executing, the plate, 11, being first covered with a ground-work of broad concentric flutes, and then the zig-zag lines, 12, being made over it.

In addition to the devices above described, provisions may be made for executing dotted and broken lines as desired, and the machine illustrated in Figs. 6 to 14 is shown as provided with means for accomplishing this design.

A number of make-and-break disks, $y$, are supported concentric with the gear $o^2$, so as to revolve therewith, and the peripheries of these disks are given a character to produce the desired design by making and breaking the circuit through the lap-controlling electro-magnets, $y'$. Insulated brushes, $y^2$, are arranged for engagement with the disks respectively, and are separately connected by wires, $y^3$, with plates, $y^4$, fastened across the under side of a board, $y^5$, of insulating material. Said board is pivotally supported on the bed of the machine, and upheld by a spring, $y^6$. On the upper side of the board a series of strips, $y^7$, are fastened, extending transversely to the plates, $y^4$, and each strip has a series of openings, $y^8$, so located that screw plugs, $y^9$, inserted through them will connect them separately with any one of the plates, $y^4$. The sleeve, $o^3$, carries affixed to it a disk, $o^7$, having a spiral peripheral rib, $o^8$, designed to engage the strips, $y^7$, successively, and by such engagement to establish and maintain an electrical circuit including the lap-controlling magnets. The said disk is in electrical connection with the frame of the machine. A wire, $w$, completes the circuit by connecting a brush, $w'$, with the battery, said brush engaging the plain periphery of a disk, $w^2$, affixed to the disks $y$, and serving to maintain electrical connection between them and the said brush, $w'$. The plugs, $y^9$, may be variously disposed to bring the make-and-break disks, $y$, into play at different stages of the work, as the spirally ribbed disk, $o^7$, enters into engagement with the upper strip, $y^7$, connected through the plug with the make-and-break disk.

A diagram of the circuit is shown in Fig. 17, in which A designates the battery or other source of electricity; B, the lap-controlling electro-magnets; C, the tracer; D, the pattern-plate; E, the spirally ribbed disk; F, the top-strip; G, the plug; H, the under plate; I, the brush; J, the plain peripheried disk said brush engages; K, the make-and-break disk; L, the brush engaging the latter; M, M', M², M³, M⁴, M⁵, and M⁶, the wires or other connections between the parts above enumerated; and N, a switch designed to connect wires M² and M³, or wires M⁶ and M³.

By the making and breaking of the circuit through the devices described, the ornamenting tool is moved into and out of operative position as desired, to produce broken or dotted lines such as shown in Fig. 15 and designated by the numerals 13, 14, and 15. This making and breaking apparatus can be thrown into and out of action by means of the switch indicated at N in the diagrammatic view, Fig. 17.

Having thus described my invention, what I claim as new, and desire to secure by Letters Patent, is—

1. In a machine of the character described, an ornamenting implement capable of assuming different angular adjustments with respect to the work, intermittently operating means for progressively varying the angularity of said implement, and means for automatically restoring the implement to its initial adjustment after it has been moved a predetermined extent.

2. In a machine of the character described, the combination with a movable work-holder, of an ornamenting implement capable of assuming different angular adjustments with respect to the work, and means actuated by the work-holder or carrier for varying the angular adjustment of the said ornamenting implement.

3. In a machine of the character described, the combination of an ornamenting implement capable of assuming different angular adjustments with respect to the work, a movable work-holder, and means actuated thereby for intermittently and progressively varying the angularity of the implement.

4. In a machine of the character described, the combination of an ornamenting implement capable of assuming different angular adjustments with respect to the work, a movable work-holder, means actuated thereby for intermittently and progressively varying the angularity of the implement, and means for automatically restoring the implement to its initial adjustment after it has been moved a predetermined extent.

5. In a machine of the character described, the combination of an oscillatory spring-pressed tool support, a ratchet for tilting the same, a movable work-holder, and means actuated thereby for intermittently moving the ratchet.

6. In a machine of the character described, the combination of an oscillatory spring-pressed tool-support having a projection or stud on one side, a ratchet having lateral teeth for engagement with said projection and peripheral teeth for engagement of a detent-pawl, a movable work-holder, and means actuated thereby for intermittently turning the ratchet.

7. In a machine of the character described, the combination of an oscillatory tool-holder for disposing the tool at different angles to the work, a tool-spindle longitudinally movable therein and yieldingly upheld, an electro-magnet carried by the oscillatory support and arranged to depress said spindle, and pattern-devices controlling an electric circuit through said magnet.

8. In a machine of the character described, a movable work-holder, a step-gage controlling the relative positions of the ornamenting implement and the work for the formation of different delineations, and means actuated by the movable work-holder for intermittently changing the adjustment of the step-gage.

9. In a machine of the character described, a movable work-holder, a rotatively adjustable step-gage controlling the relative positions of the ornamenting implement and the work for the formation of different delineations, and means actuated by the work-holder for intermittently changing the rotative adjustment of the step-gage.

10. In a machine of the character described, a movable work-holder, a step-gage controlling the relative positions of the ornamenting implement and the work, means actuated by the movable work-holder for intermittently changing the adjustment of the step-gage, a spring tending to return the gage to its initial adjustment, and means for releasing the step-gage in the restoration of parts to normal condition on the completion of a piece of work.

11. In a machine of the character described, the combination of a rotatable and longitudinally movable pattern-cam having a spiral acting section, and a work-supporting carriage having a bearing-piece for contact with the said pattern-cam, said carriage being yieldingly actuated toward the cam.

12. In a machine of the character described, the combination of a rotatable and longitudinally movable pattern-cam composed of a plurality of disks having spiral acting sections fitting together end to end, and a work-supporting carriage having a bearing-piece for contact with the pattern-cam, said carriage being yieldingly actuated toward the cam.

13. In a machine of the character described, the combination of a rotatable and longitudinally movable pattern-cam having a spiral engaging section, a carriage having a bearing-piece for contact with said cam and yieldingly actuated toward the latter, a rotary work-holder on said carriage, and gearing connecting the said work-holder and the pattern-cam, and maintaining a positive relation therebetween.

14. In a machine of the character described, the combination of a shaft, a sleeve splined thereon and having a screw, a half-nut movable into and out of engagement with said screw, a lever for returning the sleeve to its initial position, a pattern-cam on the sleeve and having a spiral peripheral acting section, a work-supporting carriage having a bearing-piece for engagement with the cam, and means for yieldingly actuating the said carriage toward the cam.

15. In a machine of the character described, the combination of an electrically controlled ornamenting tool, means for causing a traverse of the tool over the work, means for periodically changing the relation of the work and tool for the formation of different delineations, movable circuit-controlling pattern devices geared to have a fixed rate of movement relative to the tool's traverse, and a traveling contact-piece arranged to bring said devices severally into circuit, substantially as described.

16. In a machine of the character described, the combination of an electro-magnet controlling operative engagement of the tool with the work, means for periodically changing the relation of the work and tool for the formation of different delineations, means for causing a traverse of the tool over the work, circuit-controlling pattern-disks, a switch-board whose members are connected with said disks, and a screw carrying a contact-piece for successively engaging the switch-board members.

17. In a machine of the character described, the combination of an electro-magnet controlling operative engagement of the tool with the work, means for periodically changing the relation of the work and tool for the formation of different delineations, means for causing a traverse of the tool over the work, circuit-controlling pattern-disks, a switch-board whose members are connected with said disks, a screw carrying a contact-piece for successively engaging the switch-board members, a pattern-cam on said screw and having spiral acting sections, and a work-supporting carriage having a bearing piece for contact with said cam and yieldingly impelled toward the latter.

18. In a machine of the character described, the combination of an electro-magnet controlling operative engagement of the tool with the work, means for periodically changing the relation of the work and tool for the formation of different delineations, means for causing a traverse of the tool over the work, circuit controlling pattern disks, a switch-board whose members are connected with said disks, and a traveling contact piece adapted to successively connect with members of the switch-board with the changes in relation of the work and the tool.

In testimony whereof I have signed my name to this specification, in the presence of two subscribing witnesses, this 29th day of January, A. D. 1894.

EDWARD A. MARSH.

Witnesses:
A. D. HARRISON,
F. P. DAVIS.